ELECTRICAL PULSE GENERATOR AND TRANSMITTING MEANS

Filed March 6, 1964

INVENTOR.

WILLIAM O. KUHRMAN

BY

ANDRUS & STARKE

ATTORNEYS,

United States Patent Office 3,268,167
Patented August 23, 1966

3,268,167
ELECTRICAL PULSE GENERATOR AND TRANSMITTING MEANS

William O. Kuhrman, Erie, Pa., assignor to A. O. Smith Corporation, Milwaukee, Wis., a corporation of New York Filed Mar. 6, 1964, Ser. No. 349,851
7 Claims. (Cl. 235—94)

This invention relates to an electrical pulse generator and transmitting means and particularly to a small compact unit to be direct mounted upon a computing mechanism within a dispenser for explosive fluid such as a gasoline dispensing pump.

In the marketing of gasoline and the like, remote inventory controls have many advantages. In such systems, the main supplier periodically fills the storage tanks at the service station to their maximum capacity. A coded control unit is provided at the service station and interconnected with the storage tanks and/or the dispensing pumps in a manner which permits incremental releasing of selected quantities of the stored gasoline to the service station operator for subsequent dispensing from the dispensing pumps to retail customers when a proper coded input is made to the control unit. The control unit may employ a switch mechanism actuated by a counter which is preset by a properly coded input to the quantity of the material to be released. The counter is driven toward a zero or null position as the stored material is withdrawn.

The copending application of James H. McGaughey entitled Control System, filed on February 9, 1961, with Serial No. 88,208 and assigned to a common assignee herewith discloses a highly satisfactory system employing a digital type counter having a disconnect switch therein. As shown therein, a flexible cable connects an output shaft of a computer of the gasoline dispensing pump to a switch unit to cyclically open and close the switch in accordance with the actuation of the computer. The switch is connected in an electrical pulse forming circuit to transmit a pulse to a control unit and drive it to a null or disconnect position.

The coupling cable is generally employed because of space limitation and the like. Mechanical linkages have also been suggested to interconnect a register shaft to a pulse forming switch; for example, such as shown in the Kamm Patent 2,445,291 and the Wieslander Patent 3,030,015. Although such arrangements are satisfactory and permit location of the switch in spaced relation to the register, the components introduce further sources of breakdown with a resulting possible malfunctioning and loss of operating control.

The present invention is particularly directed to a switch constituting a pulse generator and transmitter or pulse transmitter which is small and compact and can be mounted directly to a register for direct coupling to an output shaft of a register or the like. In accordance with the present invention, a magnetically actuated switch is mounted within an enclosure or housing formed of a suitable magnetic material such as magnetic steel or the like with a floating self-contained permanent magnet armature disposed therein for operating the switch. The housing construction is such as to allow atmospheric interchange which prevents condensation. The housing is further formed of a suitable magnetic material to provide a magnetic shield for the operating magnetic circuit within the housing. Although the transmitter of this invention can be employed in any pulsing system, it is particularly advantageous in remote inventory control systems for gasoline and the like which are exposed to vapors and therefore require hermetic sealing to protect against contact contamination. The transmitter of this invention can be mounted directly on all of the available gasoline dispensing computer registers and the self-contained floating magnet and switch within the steel enclosure provides ready and simple alignment with the register shaft.

In a preferred construction of the present invention, the rotating armature is generally a disc-like member having a central bearing hub rotatably disposed within a switch base. A cylindrical permanent magnet is disposed within an axial opening in the outer portion of the disc and is polarized in a direction parallel to the axis of rotation. A reed switch is mounted generally tangentially of the path of the permanent magnet with the one end located immediately below a portion of the path of the permanent magnet. As the magnet passes over the switch, it causes the switch to close and open and produce a signal pulse. As the magnet approaches and is aligned with the reed switch, the contacts are oppositely polarized to create a magnetic attraction which causes them to engage.

The present invention thus provides a very simple and reliable transmitter which may be mounted to any one of a plurality of standard register units without special coupling components or the like.

The drawings furnished herewith illustrate a preferred method of carrying out the present invention and more clearly illustrate the other advantages of the particular structure as well as those hereinbefore discussed.

In the drawings:

FIG. 1 is an elevational view of a gasoline dispensing unit with parts broken away to show components of the present invention;

Figures 2, 3, 4:
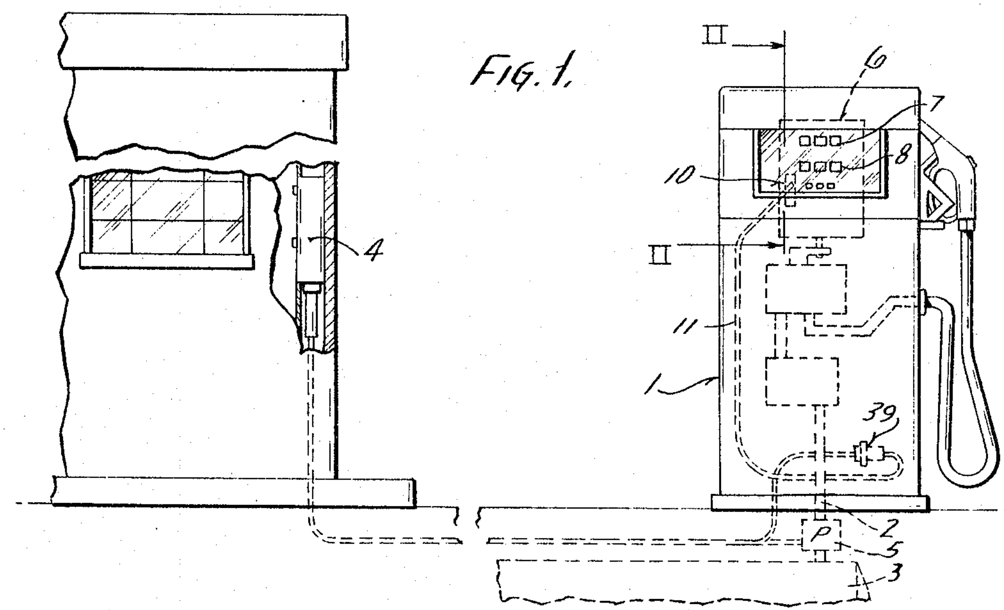
FIG. 2 is an enlarged fragmentary view of FIG. 1 with the pulse transmitter of the present invention shown in vertical section to more clearly illustrate the components thereof.
FIG. 3 is an enlarged side elevational view of the transmitter with the cover and other parts broken away to show details of construction.
FIG. 4 is a vertical section taken on line 4—4 of FIG. 2 showing a preferred switch construction.

Referring to the drawings and particularly to FIG. 1, a gasoline dispenser 1 is shown connected by a flow line or pipe 2 to a supply or storage tank 3 which is buried in the ground or the like and constitutes a main supply of gasoline for subsequent sale and delivery. Although a single gasoline dispenser 1 is shown to clearly illustrate the present invention, a plurality of gasoline dispensers will generally be provided and interconnected to the supply tank 3 by a common header, individual lines or any other suitable system in accordance with known practice. An automatic control 4 provides an overriding control of the withdrawal of the gasoline from the supply tank 3. In FIG. 1, a common pump 5 is shown for withdrawing gasoline from the tank 3 for delivery to the dispenser 1 and such other dispensers as are provided for dispensing the same gasoline. The control 4 is connected to control operation of pump 5 to prevent withdrawal from tank 3 under certain conditions as subsequently described.

Each of the gasoline dispensers includes a register 6 of a well known construction mounted within the upper portion thereof and including a gallonage display portion 7 and a price display portion 8. Additionally, such a register 6 includes a stub shaft 9 projecting laterally from the outer enclosure of the particular register 6. In accordance with the present invention, a transmitter 10 is direct coupled to the stub shaft 9 and includes an electrical transmission line or cable 11 forming a part of a pulse transmitting circuit and connected to send a pulse to the automatic control 4 for each unit delivery from the dispenser 1. The particular control 4 may be of any suitable variety such as shown in the previously referred to copending application of James H. McGaughey. As the particular control does not form an integral part of the present invention, no further description thereof is given.

The transmitter 10 which does form a very important part of the present invention includes a rectangular outer box housing 12 within which a pulse generating reed switch assembly 13 and a rotating armature 14 are housed. The transmitter 10 is mounted by a mounting bracket 15 to the side of the register 6 with the stub shaft 9 projecting into the housing and coupled to the rotating armature 14 as hereinafter described. The mounting bracket 15 is generally an elongated member having a U-shaped cross section with a frame attachment bolt 16 threaded through one of the flanges and into the counter frame 17. A mounting screw 18 extends through the opposite flange of the mounting bracket 15 and threads into a suitably tapped or nut opening in the bottom housing 12. A complementing U-shaped seal cover 19 fits over the opening of the bracket 15 with side arms closing the ends of the bracket. A locking stud 20 projects from the base of the bracket 15 and passes through a suitable opening in the base of the cover 19. A seal wire 21 is passed through a small opening in the outer end of the stud 20 with the ends of the wire 21 interconnected by a lead seal 22. This provides a locking or sealing of the transmitter to the register and prevents tampering with the register or transmitter.

The transmitter housing 12 of the transmitter 10 includes a base and four side walls defining the box-like structure. Opposite short side walls of the rectangular housing 12 include outwardly extending mounting tabs or flanges 23 disposed inwardly from the outermost edge of the adjacent side walls generally by a distance corresponding to the thickness of a cover 24. The cover is secured overlying the opening to the housing 12 and the flanges 23 and is permanently fixed in place by securing rivets 25 which extend through the cover 24 and the respective flanges 23. The side edges of the cover 24 are spaced slightly from the adjacent side walls of the housing 12 to define breathing spaces or openings 26 therebetween. This provides a restricted opening or passage through which an interchange in the atmosphere can occur and thus prevent building up of moisture and dirt within the housing which would adversely affect the operation of the rotor assembly within the assembly.

Generally, the switch assembly 13 includes a free-floating rectangular mounting block 27 formed of a suitable non-magnetic material and disposed within housing 12 to support the switch and serve as a bearing. The illustrated rectangular block 27 includes a central opening 28 aligned with a somewhat larger opening in the base of the housing 12 and through which the stub shaft 9 of the register projects into coupling with the armature 14. Additionally, a reed switch 29 is disposed within a groove 30 extending along the longer edge of the block 27. The reed switch 29 which is more fully described presently, is secured within the groove by a potting material 31 which completely fills the groove and which is preferably a suitable pliable medium to provide a stress free switch mounting as well as to seal the bare ends of the connecting leads which are noted subsequently. The groove 30 is disposed immediately adjacent the housing 12 with the back side of block 27 serving as a guide surface for the armature assembly 14.

The illustrated reed switch 29 which is disposed within groove 30 is of a known construction and includes a tubular or cylindrical or glass shell 32 having reed switches or contacts 33 and 34 mounted in the opposite ends thereof and projecting therethrough. Within the shell 32, the inner ends of the reed contacts 33 and 34 overlap and are normally biased in spaced relation to each other to provide a pair of opened contacts. The ends of the shell 32 are sealed as at 35 in any suitable manner; for example, heating of the glass to collapse and to fuse the glass to the adjacent reed contacts. The outer ends of the reed contacts 33 and 34 constitute terminals 36 to which transmission wires 37 are connected and extend outwardly from the groove to provide and form a part of the transmission line or cable 11. The potting compound 31, as most clearly shown in FIG. 4, completely encases the connection of wires 37 to contacts 33 and 34. In the illustrated embodiment of the invention, the transmission wires 37 pass through a flexible cable 38 secured to the housing and terminated in a suitable coupling 39 which connects the wires to the cable 11.

As previously noted, the reed contacts 33 and 34 are mounted to have the overlapping inner ends disposed in spaced relation. The armature 14 as hereinafter described includes a magnetic actuator for periodically closing the contacts.

Generally, the illustrated armature 14 is a disc-like member 40 having a central hub 41 journaled within the bearing opening 28 in the switch block 27. A central coupling shaft 42 is secured within the hub 41 and interconnected with the register stub shaft 9 through a slotted pinned coupling 43. Thus, as the register is actuated to record the amount of gasoline dispensed from dispenser 1, the stub shaft 9 will be driven in synchronism with the flow rate. This in turn will drive the armature disc 40 at a corresponding speed.

The disc 40 has a diameter generally corresponding to the short width or dimension of the housing 12 such that the outer portion of the disc continously overlies the reed switch 29. A cylindrical permanent magnet 44 is press fitted or otherwise secured within an appropriate opening in the outer portion of the disc 40. The permanent magnet 44 is polarized in a generally axial direction, shown with an inner north pole N and an outer south pole S for purposes of discussion, such that the magnetic field therethrough passes parallel to the axis of rotation and is directed toward the switch assembly 13 when the magnet 44 is aligned with the reed switch 29. Although magnet 44 may be any suitable permanent magnet it is preferably a ceramic magnet which can be readily magnetized in the axial direction with a small length to width ratio, as shown.

The switch block 27 is formed as a non-magnetic material such that the flux from the permanent magnet will extend inwardly toward the base of the housing. A non-magnetic spacer and bearing plate or member 45 is disposed between the cover 24 and the back side of the disc 40 to provide a bearing face slightly spaced from the adjacent face of the disc 40.

The disc 40 is formed of any suitable non-magnetic material and is preferably formed of a self-lubricating plastic material such as Teflon and the like to provide self-lubricating and long wearing bearing surfaces. However, if desired, the disc 40 may be die cast of suitable non-magnetic metal and the switch block 27 and bearing plate 45 formed of a suitable plastic or other bearing material.

In operation, the armature 14 which is coupled directly to the stub shaft 9 is rotated in synchronism with the dispensing of fluid or of gasoline from the dispensing unit or pump 1. The connection by the slot and pin 43 provides a mechanical coupling which can accommodate substantial variation in shaft length. The disc 40 is supported in the axial direction between the opposed faces of bearing member 45 and the switch block 27 and in the radial direction by the shaft 9. The mounting of the disc 40 and the switch block 27 provides a free floating mounting which permits substantial tolerance in the alignment of the transmitter 10 and shaft 9. As the switch block 27 moves with the disc 40, the relationship between the switch 29 and magnet 44 is maintained.

The rate of disc rotation is directly proportional to the rate of flow. As a result, the permanent magnet 44 is aligned with the reed switch 29 once each unit flow to effect engagement of the reed contacts 33 and 34 which return to the normally open position as soon as the magnet 44 is rotated from alignment therewith.

As the magnet 44 moves into overlapping alignment with leaf spring contact 33, opposite poles are induced in the leaf springs as a result of the flux which passes from contact 33 to contact 34 and then back to magnet 44 through the air path. As a result, the leaf springs are attracted to each other and will close the circuit path therebetween. When the field of magnet 44 is removed as the result of the rotation of the disc 40, the resiliency in the contacts 33 and 34 causes them to separate, as shown in FIG. 4, and open the circuit path. Further, as the magnet 44 is rotated from initial closing alignment and is over the contacts 33 and 34, as shown in FIG. 2, the magnetic field passes directly into both contacts 33 and 34 and induces like poles in the contacts 33 and 34 and thereby provides a positive opening thereof. Although as the magnet 44 moves over the arm 34, a closing force will tend to be established, the field is being rapidly reduced in contrast to the build-up provided as the magnet moves over arm 33. Consequently, the contacts 33 and 34 remain open. This has been found to provide a high degree of reliability of positive opening of the circuit to produce a single pulse per unit of fluid flow.

Further, the present invention does not require precise alignment of the magnet 44 relative the contact arms of the switch 29. The assembly is therefore particularly adapted to highly practical manufacturing methods and systems.

The contacts 33 and 34 are thus closed and opened once per unit flow and establish a pulse signal in the transmission line 11. This pulse is fed to the automatic control 4 to drive the disconnect mechanism, not shown, to a null position. If the disconnect mechanism is once driven to a null position, the apparatus must be reset through a coded input or the like in order to permit subsequent withdrawal.

The mounting of the rotating armature within the switch assembly with a free floating system is of substantial practical significance because it accommodates substantial misalignment. This then reduces the cost and skill required not only in manufacture but also in installation. It is particularly desirable in permitting field mounting and installation on existing units.

The steel housing constitutes a magnetic short circuit for any extraneous magnetic signals and prevents erroneous operation of the reed switch as a result of any magnetic fields established within the dispenser; for example, as a result of other motors or the like. The reed switch is completely encapsulated in glass to eliminate any possible contamination due to dirty atmospheres. Further, the housing with the breathing opening eliminates condensation and building up of foreign material within the transmitter unit.

The small compact transmitter of the present invention provides a very reliable pulse generating means which can be directly mounted within the dispensing unit for an explosive fluid and sealed to prevent undetectable tampering therewith.

Various modes of carrying out the invention are contemplated as being within the scope of the following claims particularly pointing out and distinctly claiming the subject matter which is regarded as the invention.

I claim:

1. A switching apparatus comprising, a rectangular housing formed of a magnetic material and having opposed side walls and opposed end walls integrally secured to each other and to a base wall and having a removal cover wall releasably secured at opposite ends to the opposed end walls and being spaced from the opposite opposed side walls to allow atmospheric breathing and having an opening centrally of the base wall, a switch block formed of non-magnetic material adjacent to the base wall, said block being approximately one-half the depth of the housing and conforming to the shape of the housing, said block including a bearing opening centrally of the block aligned with the opening of the housing and a groove in the surface adjacent the base wall extending parallel to and adjacent a side wall, a glass encapsulated reed switch having contact arms and exposed ends of said contact arms with connecting leads attached to said ends and disposed within the groove, a pliable potting material disposed within the groove to support the reed switch, and to seal the connection of the leads to the contacts, a rotating disc having a central hub journaled within the bearing opening, the diameter of said disc being selected to overlie said reed switch, means to couple a shaft to the hub and form a support for the disc, a permanent magnet secured within an opening in the disc, said permanent magnet being polarized axially of the disc and establishing a magnetic field cyclically impressed upon the reer switch, and a spacer secured to the inner surface of the cover.

2. The switching apparatus of claim 1 wherein said reed switch includes an outer tubular glass shell with the contact arms projecting inwardly from the opposite ends into overlapping relationship and having the contacts on the the overlapped ends, and said overlapped ends are located with respect to the axis of the permanent magnet such that as said magnet is moved over the one arm the magnet field magnetically moves them together and closes the contacts and as the magnet is thereafter momentarilly aligned with the contacts the magnetic field separates the arms and opens the contacts as the magnet passes over the reed switch.

3. A switching apparatus comprising, a rectangular housing formed of a magnetic material and having an opening in a base wall thereof, a switch block formed of non-magnetic material movably disposed within the housing and having a bearing opening aligned with the opening of the housing, and a groove in the surface adjacent the base wall extending past the opening, a switch disposed within the groove, said switch being biased to a first switch position and magnetically actuable to a second switch position, a rotating disc having a central hub journaled within the bearing opening and establishing a free floating mounting of the block and disc, said disc overlying said switch, means to couple a shaft to the hub and form a support for the disc, and a permanent magnet secured within an opening in the disc, said permanent magnet being polarized axially of the disc and establishing a magnetic field cyclically impressed upon the switch.

4. A switching apparatus for cyclically opening and closing a circuit, comprising an input shaft coupled to a load, a transmitter housing having a shaft opening for receiving said shaft, a switch assembly within the housing and having a switch block movably disposed within the housing base with a bearing opening aligned with the shaft opening and having a switch disposed within the switch block, and an armature having a hub having a diameter less than the bearing opening in the base block and journaled in the bearing opening and rotatably mounted therein and having a coupling means for said input shaft to provide a free floating mounting of the armature and the switch block, a flux generating member carried by the armature for operating the switch upon selected alignment therebetween, said armature being aligned by mounting to the input shaft to position the flux generating means to cyclically move past the switch during rotation of the armature.

5. A switching apparatus comprising, a housing having a shaft opening, a magnetically responsive switch disposed within the housing to one side of the opening, a free floating member disposed within the housing and having a bearing opening in alignment with said shaft opening, a rotatable member having a body portion opposite coplanar surfaces and with a central hub rotatably extending from one of said coplanar surfaces and disposed within the free-floating member, said hub having an outer diameter providing a clearance therebetween, a permanent magnet secured to the said body portion radially outwardly of the hub for periodic alignment with the switch upon rotation of the body portion, said body portion and hub being formed of a self-lubricating plastic material, and bearing means within the housing in alignment with the opposite faces of the block and spaced slightly in excess of the thicknes of the block to provide axial bearing support for the rotatable operating unit.

6. Apparatus for generating a train of electrical pulses proportional to the flow of an explosive fluid such as gasoline or the like, comprising a dispenser for the fluid having a register for recording the volumetric flow, said register including an enclosure with a stub shaft coupled to the counting mechanism protruding therefrom, a transmitter housing formed of a magnetic material attached to the register overlying the stub shaft, said housing having a base with an opening aligned with the shaft and having side walls and end walls with outwardly extending cover mouting flanges integrally formed therewith, a cover fixedly secured to the flanges and overlying the housing and spaced from the side walls, a switch assembly within the housing including a switch block formed of non-magnetic material movably disposed within the housing with a bearing opening aligned with the stub shaft and having a switch recess in the block extending adjacent and parallel to a side wall of the housing, a glass enclosed reed switch disposed within the groove and held therein by a potting material filling the groove, a disc-shaped armature having a central hub journaled in the bearing opening and having a coupling slot to receive said stub shaft to provide a free floating mounting of the armature and switch block, and a permanent magnet secured within an opening through an outer portion of the armature and polarized axially thereof to close the reed switch when aligned therewith.

7. The apparatus of claim 6 having a generally U-shaped mounting bracket with the transmitter housing secured to one arm and the base disposed adjacent the register wall and having a seal pin protruding outwardly from the bracket, a sealing cap fitted within the mounting bracket and having an opening accommodating said seal pin, and a seal means secured to the outer end of the pin which must be disrupted to remove the cap.

References Cited by the Examiner

UNITED STATES PATENTS

| | | | |
|---|---|---|---|
| 2,207,506 | 7/1940 | Cox | 179—90 |
| 2,269,242 | 1/1942 | Bakke | 200—19 |
| 2,448,779 | 9/1948 | Crise | 200—19 |
| 2,791,657 | 5/1957 | Bloxom | 200—87 X |
| 2,908,778 | 10/1959 | Strandberg | 200—19 |
| 3,012,116 | 12/1961 | Boylan | 200—87 |
| 3,030,015 | 4/1962 | Weislander | 235—94 |
| 3,154,672 | 10/1964 | Larkin | 235—94 X |

RICHARD B. WILKINSON, *Primary Examiner.*

LEO SMILLOW, *Examiner.*

TERRY J. ANDERSON, *Assistant Examiner.*